United States Patent [19]

Perry

[11] Patent Number: 4,706,912

[45] Date of Patent: Nov. 17, 1987

[54] STRUCTURAL EXTERNAL INSULATION FOR HYPERSONIC MISSILES

[75] Inventor: John S. Perry, Seattle, Wash.

[73] Assignee: The United States of America as represented by the Secretary of the Army, Washington, D.C.

[21] Appl. No.: 808,982

[22] Filed: Dec. 16, 1985

[51] Int. Cl.⁴ .............................................. B64G 1/58
[52] U.S. Cl. ............... 244/158 A; 428/473.5; 523/179; 523/138
[58] Field of Search .......... 244/117 A, 117 R, 158 A, 244/160; 428/913, 920, 902, 446, 408, 473.5; 523/179, 138; 524/600

[56] References Cited

U.S. PATENT DOCUMENTS

| | | | |
|---|---|---|---|
| 3,177,811 | 4/1965 | Baylor et al. | 244/158 A |
| 3,270,503 | 9/1966 | Meyers | 244/158 A |
| 3,745,928 | 7/1973 | Kinnaird et al. | 244/158 A |
| 3,870,677 | 3/1975 | Farrissey, Jr. et al. | 524/600 |
| 3,920,339 | 11/1975 | Fletcher | 244/117 A |
| 4,124,732 | 11/1978 | Leger | 244/158 A |
| 4,360,626 | 11/1982 | ManWiller | 524/600 |
| 4,373,006 | 2/1983 | Galasso et al. | 428/902 |
| 4,431,697 | 2/1984 | Rolinski et al. | 244/117 A |
| 4,496,621 | 1/1985 | Hubert et al. | 428/408 |
| 4,617,232 | 10/1986 | Chandler et al. | 428/408 |
| 4,631,335 | 12/1986 | Scola et al. | 524/600 |

Primary Examiner—Jeffrey V. Nase
Assistant Examiner—Lynn M. Fiorito
Attorney, Agent, or Firm—Freddie M. Bush; James T. Deaton

[57] ABSTRACT

A structural external insulation for hypersonic missiles which reach speeds that cause surface temperatures on the cylindrical shell structure to reach up to 3000° F. for a period of time. The invention incorporates efficient high temperature insulation as an integral part of the composite shell manufacturing process (tape layup and/or filament winding).

6 Claims, 4 Drawing Figures

STRUCTURAL EXTERNAL INSULATION FOR HYPERSONIC MISSILES

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

Hypersonic missiles now being designed and developed for use in the next decade will reach speeds that cause surface temperatures on the cylindrical shell structure to reach up to 3000° F. for periods of 1 to 10 seconds. Trade studies have usually shown graphite composite structure to be the most weight efficient and cost effective when compared to metal structure. The highest temperature graphite composites using polyimide or PBI resin systems show useful strength for short periods (10 to 30 sec) up to 800° F. or 1000° F. These temperatures cannot be exceeded, therefore insulation is required, adding dead weight and cost.

For theses short exposures to high temperature an ablative surface insulation has usually been found most efficient in controlling surface temperature at the structural interface. Silicone rubber or phenolic-silica have most commonly been used to date. The phenolic-silica was found to be most effective for lowest weight. However, it must be formed at high pressure and temperature and is, therefore, usually made in segments (tiles) and bonded to the surface of the structure with low modulus adhesive. Neither system contributes any appreciable strength or stiffness to the basic structure. In may cases the insulation weight is comparable to the weight of the structural shell. The extra manufacturing steps are costly and time-consuming. Ablation often occurs in a non-uniform manner, degrading aero performance and results in more non-uniform heat transfer.

DESCRIPTION OF THE PREFFERED EMBODIMENT

Figure 1:
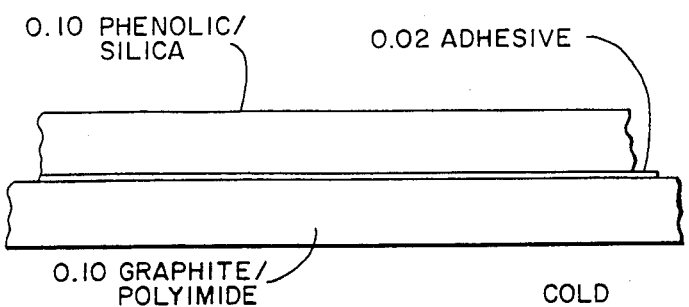
FIG. 1 is an elevational sectional view of a conventional structure and insulation for a hypersonic missile prior to being subjected to very high temperature during flight of the hypersonic missile.
Figure 2:
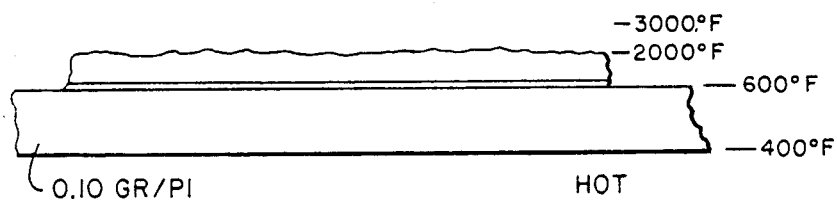
FIG. 2 is an elevational sectional view of a conventional structure and insulation for a hypersonic missile responsive to being subjected to very high temperature during flight of the hypersonic missile.
Figure 3:
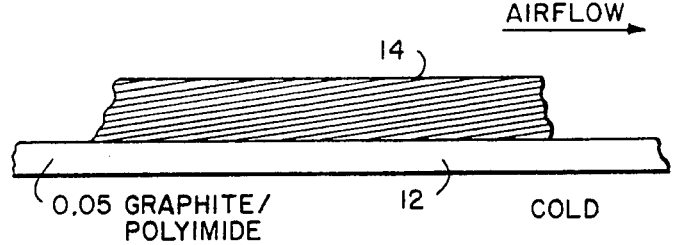
FIG. 3 is an elevational sectional view of the structural insulation for a hypersonic missile in accordance with the present invention, prior to being subjected to very high temperature during flight of the hypersonic missile.

As seen in FIG. 3 the structural external insulation of the present invention for a hypersonic missile is illustrated while still cold, i.e., prior to being subjected to the high surface temperatures encountered by the missile while in flight. The structural external insulation of the present invention incorporates efficient high temperature insulation as an integral part of the composite shell manufacturing process (tape layup and/or filament winding). The graphite/polyimide or PBI basic structural shell 12 is layed up first on the mandrel. The outer part of the shell 14 is then layed up with ceramic fibers such as Nextel (aluminum oxide, boron oxide, and silicon dioxide) or Nicalon (silicon carbide), with no change of resin system. When complete, the entire shell structure can be cured at one time. The layers of ceramic fiber on the outer portion of the shell can have the plies oriented to match the modulus of the underlying graphite structure in the direction of critical stress, achieving a structural entity which takes the high loads at launch. In order to achieve a desired match of CTE (Coefficient of Thermal Expansion) some percentage of Kevlar fiber (negative CTE) can be mixed with the ceramic fiber. The manner of laying up the ceramic fibers constitutes the most unique part of this invention, as shown in FIG. 3 and described below:

The ceramic fibers are laid on the graphite composite shell in a shingled or overlapping manner. This construction results in each ceramic fiber being anchored in an intact resin area, even after the outer surface resin has charred or vaporized (ablated). On the surface will be nothing but white-hot ceramic fibers providing efficient insulation by re-radiation and by unbonded low conductivity fibers.

Figure 4:
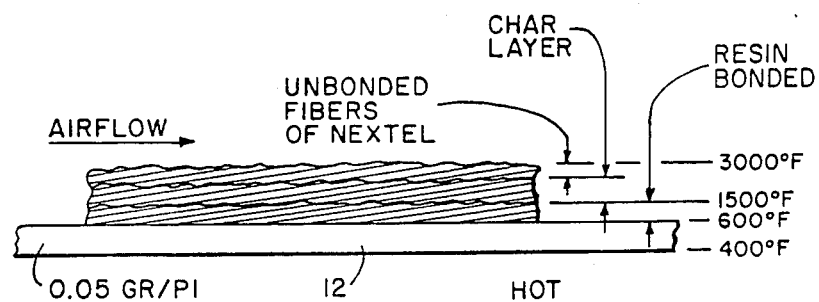
FIG. 4 is an elevational sectional view of the structural insulation for a hypersonic missile in accordance with the present invention, responsive to being subjected to very high temperatures during flight of the hypersonic missile.

FIG. 4 illustrates the structural external insulation after being subjected to extremely high temperatures during flight of the hypersonic missile.

The maximum bending loads on high speed missiles usually occur at launch or immediately following launch before temperature rise. Therefore, if the external insulation can also carry part of the load, the total shell thickness can be decreased up to 30% compared to a shell with non-structural insulation. After reaching high temperatures, loads are usually relatively low and the external ceramic fiber portion of the shell is no longer required to carry loads. It only has to act as thermal insulation.

A further advantage results from the insulation layer remaining a more constant thickness because the anchored fibers will be retained in place. This aids in aero performance and more uniform heat transfer or insulation properties. Conventional flat plies tend to strip away due to high air shear as the resin burns away on the outside.

I claim:

1. In a missile having a cylindrical shell structure and disposed for traveling at substantially hypersonic velocities, means for insulating the cylindrical shell structure as well as forming an integral part of the structure of said shell comprising:
    a. said cylindrical shell structure being a structural shell forming said missile, and said structural shell being wound layers of graphite/polyimide material with said polyimide material serving as a resin system; and,
    b. said means for insulating the cylindrical shell structure being cover means for covering said shell and forming an integral structural assembly therewith, said cover means being wound layers of ceramic fibers with the same resin system as said shell to form said integral structural assembly when the resin system is cured, and said cover means disposed for ablation responsive to said missile substantially attaining said hypersonic velocities.

2. Apparatus as in claim 1 wherein said ceramic fibers are silicon carbide.

3. Apparatus as in claim 1 wherein said cover means is fabricated to have matching coefficient of expansion to the shell structure.

4. Apparatus as in claim 3 wherein said ceramic fibers are made of materials including aluminum oxide, boron oxide and silicon dioxide.

5. Apparatus as in claim 3 wherein said ceramic fibers are silicon carbide.

6. Apparatus as in claim 1 wherein said ceramic fibers are made of materials including aluminum oxide, boron oxide, and silicon dioxide.

* * * * *